US010190486B2

(12) United States Patent
Ali Khan et al.

(10) Patent No.: US 10,190,486 B2
(45) Date of Patent: Jan. 29, 2019

(54) TURBOCHARGER WITH TWIN WASTE-GATE VALVES

(71) Applicant: GM GLOBAL TECHNOLOGY OPERATIONS LLC, Detroit, MI (US)

(72) Inventors: Maqsood Rizwan Ali Khan, Rochester Hills, MI (US); Pulasti Bandara, Clinton Township, MI (US); Mark R. Claywell, Brimingham, MI (US)

(*) Notice: Subject to any disclaimer, the term of this patent is extended or adjusted under 35 U.S.C. 154(b) by 241 days.

(21) Appl. No.: 15/233,275

(22) Filed: Aug. 10, 2016

(65) Prior Publication Data

US 2018/0045104 A1 Feb. 15, 2018

(51) Int. Cl.
  *F02D 23/00* (2006.01)
  *F02B 33/44* (2006.01)
  *F02B 37/18* (2006.01)

(52) U.S. Cl.
  CPC .... *F02B 37/183* (2013.01); *F01N 2900/1602* (2013.01)

(58) Field of Classification Search
  CPC .................. F02B 37/183; F01N 2900/1602
  USPC ..... 60/602; 137/595, 862, 607, 601, 601.05, 137/601.01
  See application file for complete search history.

(56) References Cited

U.S. PATENT DOCUMENTS

| 4,294,205 A * | 10/1981 | Iiyama | F02M 13/046 137/607 |
| 4,617,799 A * | 10/1986 | Todokoro | F01D 17/18 60/602 |
| 5,046,317 A * | 9/1991 | Satokawa | F02B 37/183 60/602 |
| 5,427,141 A * | 6/1995 | Ohtsubo | F16K 11/0525 137/595 |
| 5,996,348 A * | 12/1999 | Watkins | F02B 37/183 60/602 |
| 7,363,761 B1 * | 4/2008 | Dickerson | F02B 37/18 60/602 |
| 8,033,108 B2 * | 10/2011 | Ishikawa | F02B 37/183 60/602 |
| 8,196,403 B2 * | 6/2012 | Hittle | F02M 26/47 60/602 |

(Continued)

FOREIGN PATENT DOCUMENTS

| DE | 19853392 A1 * | 5/2000 | ............ F02B 37/183 |
| JP | 01187320 A * | 7/1989 | |

(Continued)

*Primary Examiner* — Thai Ba Trieu
(74) *Attorney, Agent, or Firm* — Quinn IP Law

(57) ABSTRACT

A turbocharger includes a compressor wheel configured to pressurize an airflow for delivery to an internal combustion engine. The turbocharger also includes a turbine wheel configured to be driven by the engine's post-combustion gases and drive the compressor wheel. The turbocharger additionally includes a waste-gate assembly. The waste-gate assembly includes a first waste-gate valve and a second waste-gate valve, wherein each of the first and second waste-gate valves is configured to selectively redirect at least a portion of the post-combustion gases away from the turbine wheel into the exhaust passage. A vehicle having an internal combustion engine operatively connected to such a turbocharger and also employing a controller configured to regulate the first and second waste-gate valves is also disclosed.

17 Claims, 5 Drawing Sheets

(56) References Cited

U.S. PATENT DOCUMENTS

| | | | | |
|---|---|---|---|---|
| 8,336,309 B2* | 12/2012 | McEwan | ............... | F02B 37/183 |
| | | | | 60/602 |
| 2006/0289072 A1* | 12/2006 | McMullen | ............ | F02B 37/183 |
| | | | | 137/601.01 |
| 2015/0300244 A1* | 10/2015 | Stilgenbauer | ......... | F02B 37/183 |
| | | | | 415/145 |
| 2017/0370278 A1* | 12/2017 | McGahey | ............... | F16K 3/085 |

FOREIGN PATENT DOCUMENTS

| | | | | | |
|---|---|---|---|---|---|
| JP | 2015001203 A | * | 1/2015 | ............. | F02B 37/18 |
| JP | 2015045295 A | * | 3/2015 | ............ | F02B 37/013 |

* cited by examiner

TURBOCHARGER WITH TWIN WASTE-GATE VALVES

TECHNICAL FIELD

The present disclosure relates to a turbocharger employing twin waste-gate valves.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress an airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power. Frequently, such turbochargers are driven by the engine's exhaust gases.

A typical exhaust gas driven turbocharger includes a central shaft that is supported by one or more bearings and that transmits rotational motion between a turbine wheel and an air compressor wheel. Both the turbine and compressor wheels are fixed to the shaft, which in combination with various bearing components constitute the turbocharger's rotating assembly. Turbochargers frequently employ waste-gate valves to limit operational speeds of the rotating assembly in order to maintain turbocharger boost within prescribed limits and prevent rotating assembly over speed.

SUMMARY

One embodiment of the disclosure is directed to a turbocharger configured to pressurize an airflow to be delivered to an internal combustion engine that generates post-combustion gases. The turbocharger includes a compressor wheel configured to pressurize the airflow. The turbocharger also includes a turbine wheel configured to be driven by the post-combustion gases and drive the compressor wheel. The turbocharger additionally includes a waste-gate assembly. The waste-gate assembly includes a first waste-gate valve and a second waste-gate valve, wherein each of the first and second waste-gate valves is configured to selectively redirect at least a portion of the post-combustion gases away from the turbine wheel into the exhaust passage.

The turbocharger may include a turbine housing defining a first bypass and a second bypass. In such a case, the turbine wheel can be disposed inside the turbine housing and each of the first bypass and second bypass can generate a respective first and second fluid path for redirecting at least a portion of the post-combustion gases away from the turbine wheel. Additionally, the first waste-gate valve can be configured to selectively open and close the first bypass, while the second waste-gate valve can be configured to selectively open and close the second bypass.

The first bypass can have a first cross-sectional area and the second bypass can have a second cross-sectional area. The first cross-sectional area can be greater than the second cross-sectional area.

The first waste-gate valve can be characterized by a first valve diameter and the second waste-gate valve can be characterized by a second valve diameter. The first valve diameter can be greater than the second valve diameter.

The turbocharger may additionally include a first actuator configured to operate the first waste-gate valve and a separate second actuator configured to operate the second waste-gate valve.

The first waste-gate valve can be configured to pivot about a first axis and the second waste-gate valve can be configured to pivot about a second axis that is distinct from the first axis.

The turbocharger may also include a single, common actuator and a linking mechanism together configured to selectively operate the first and second waste-gate valves.

Both the first waste-gate valve and the second waste-gate valve can be configured to pivot about a single, common axis.

Another embodiment of the present disclosure is directed to a vehicle having an internal combustion engine operatively connected to the turbocharger as described above. The vehicle also includes a controller configured to identify a cold-start of the engine. The controller is configured to open the first waste-gate valve and the second waste-gate valve in response to the identified cold-start of the engine. The controller is also configured to identify a boosted operation of the engine. The controller is additionally configured to regulate at least one of the first waste-gate valve and the second waste-gate valve in response to the identified boosted engine operation.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
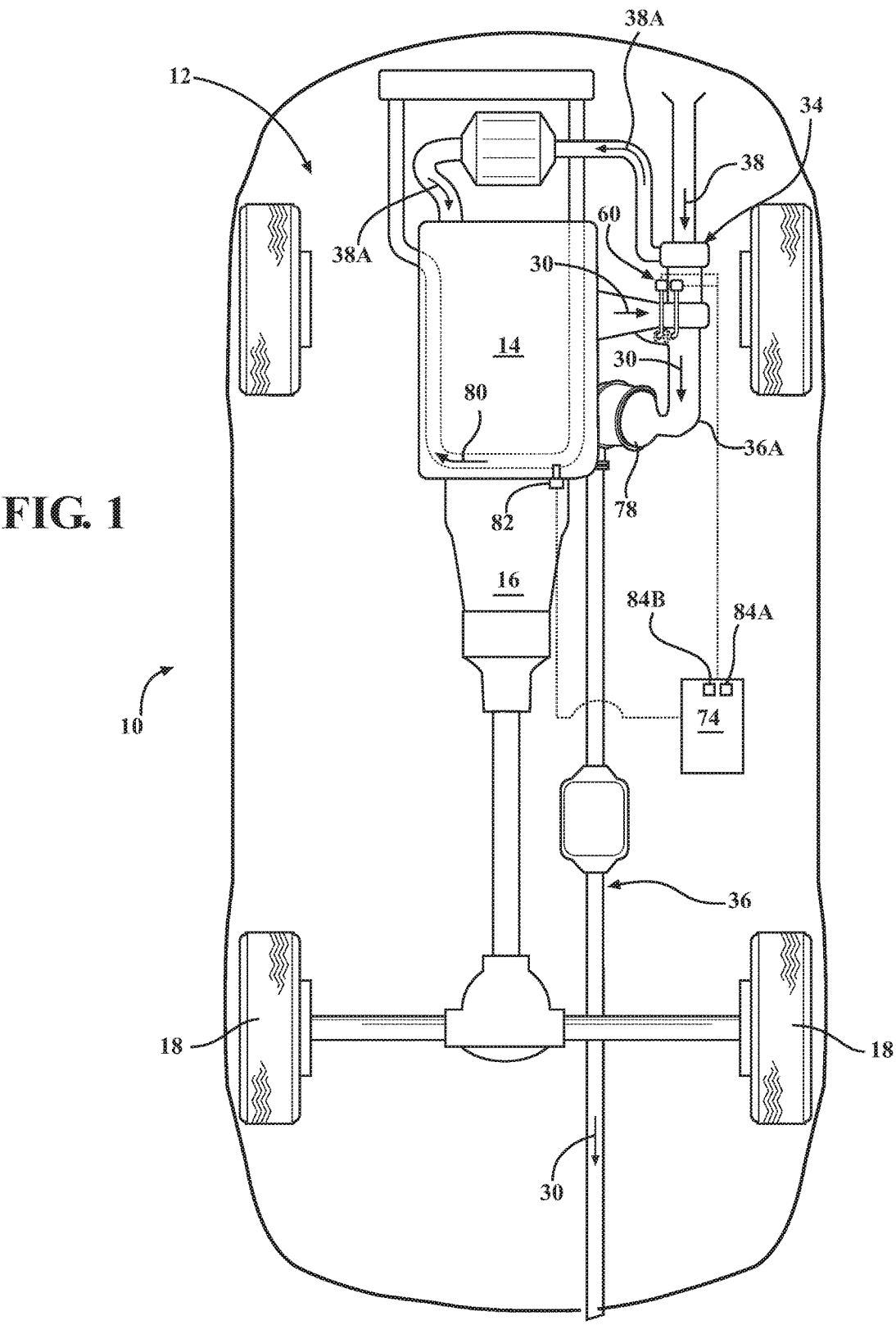
FIG. 1 is a schematic plan view of a motor vehicle having a powertrain, including an engine with a turbocharger according to the disclosure.

Referring to the drawings, wherein like reference numbers refer to like components throughout the several views, FIG. 1 schematically depicts a vehicle 10. The vehicle 10 employs a powertrain 12. The powertrain 12 includes an internal combustion engine 14, a transmission 16, and drive wheels 18, wherein the engine is configured to power the vehicle by sending engine torque through the transmission to the drive wheels. The engine 14 may be a diesel, i.e., a compression-ignition type, or a gasoline, i.e., a spark-ignition type, engine. Although the vehicle 10 is depicted as having a standard powertrain 12, where the primary powerplant is the engine 14, the vehicle may also be a hybrid type, where one or more electric motors (not shown) are used in powering the vehicle.

Figure 2:
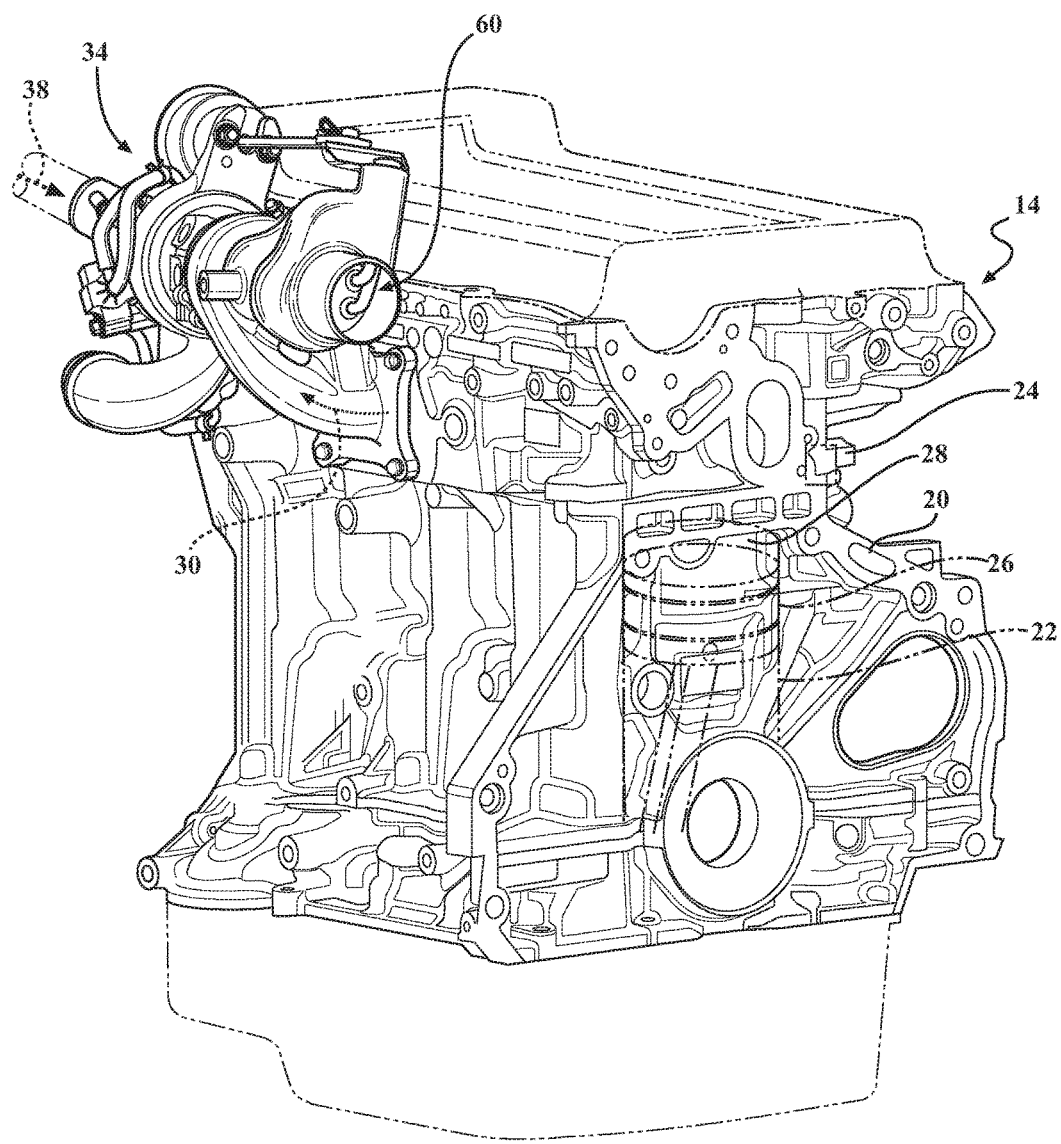
FIG. 2 is a perspective view of the engine with the turbocharger shown in FIG. 1.

As shown in FIG. 2, the engine 14 includes a cylinder block 20 with a plurality of cylinders 22 arranged therein. The engine 14 may also include a cylinder head 24 that is mounted on the cylinder block 20. Each cylinder 22 includes a piston 26 configured to reciprocate therein. Combustion chambers 28 are formed within the cylinders 22 between the bottom surface of the cylinder head 24 and the tops of the pistons 26. As known by those skilled in the art, each of the combustion chambers 28 receives fuel and air via the cylinder head 24 that form a fuel-air mixture for subsequent combustion inside the subject combustion chamber. The cylinder head 24 is also configured to exhaust from the combustion chambers 28 post-combustion gases 30 as a by-product of generated engine power.

After the air-fuel mixture is burned inside a specific combustion chamber 28, the reciprocating motion of a particular piston 26 serves to exhaust the post-combustion gases 30 from the respective cylinder 22. As shown in FIGS. 1 and 2, the engine 14 is fluidly connected to a turbocharger 34. The turbocharger 34 is energized by a flow of the post-combustion gases 30 released by individual cylinders of the engine 14 following each combustion event. The turbocharger 34 is connected to an exhaust passage 36A of an exhaust system 36 that receives the post-combustion gases 30 and eventually releases the exhaust gases to the ambient, typically on a side or aft of the vehicle 10. The turbocharger 34 receives an airflow 38, pressurizes the received airflow, and discharges the pressurized airflow 38A to the engine 14. The pressurized airflow 38A is then distributed to the cylinders 22 for mixing with an appropriate amount of fuel and subsequent combustion of the resultant fuel-air mixture therein.

Figure 3:
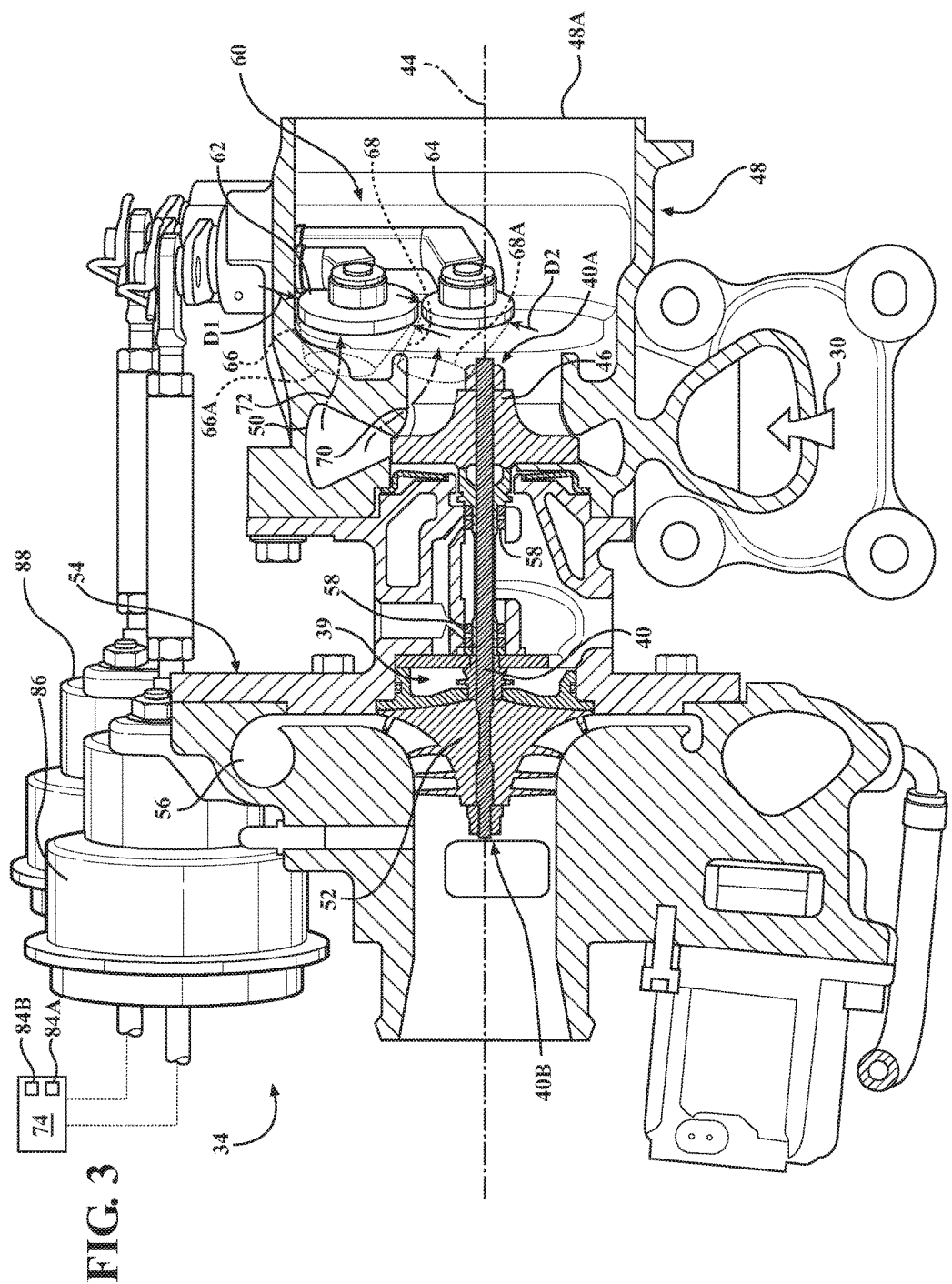
FIG. 3 is a partial cross-sectional side view of the turbocharger shown in FIG. 1, showing one embodiment of a waste-gate assembly according to the disclosure.

As shown in FIG. 3, the turbocharger 34 includes a rotating assembly 39. The rotating assembly 39 includes a shaft 40 having a first end 40A and a second end 40B. The rotating assembly 39 also includes a turbine wheel 46 mounted on the shaft 40 proximate the first end 40A and configured to be rotated along with the shaft 40 about an axis 44 by post-combustion gases 30 emitted from the cylinders 22. The turbine wheel 46 is disposed inside a turbine housing 48 that includes at least one turbine volute or scroll 50. The turbine scroll 50 receives the post-combustion exhaust gases 30 and directs the exhaust gases to the turbine wheel 46. The turbine scroll 50 is configured to achieve specific performance characteristics, such as efficiency and response, of the turbocharger 34.

As further shown in FIG. 3, the rotating assembly 39 also includes a compressor wheel 52 mounted and retained on the shaft 40 proximate the second end 40B. The compressor wheel 52 is configured to pressurize the airflow 38 being received from the ambient for eventual delivery to the cylinders 14. The compressor wheel 52 is disposed inside a compressor cover 54 that includes a compressor volute or scroll 56. The compressor scroll 56 receives the airflow 38 and directs the airflow 38 to the compressor wheel 52. The compressor scroll 56 is configured to achieve specific performance characteristics, such as peak airflow and efficiency of the turbocharger 34. Accordingly, rotation is imparted to the shaft 40 by the post-combustion exhaust gases 30 energizing the turbine wheel 46, and is in turn communicated to the compressor wheel 52 owing to the compressor wheel being fixed on the shaft.

The entire rotating assembly 39 is supported for rotation about the axis 44 via journal bearings 58 that are lubricated by oil and additionally cooled by a supply of engine coolant. During operation of the turbocharger 34, the rotating assembly 39 may frequently operate at speeds over 100,000 revolutions per minute (RPM) while generating boost pressure for the engine 14. As understood by those skilled in the art, the variable flow and force of the post-combustion exhaust gases 30 influences the amount of boost pressure that may be generated by the compressor wheel 52 throughout the operating range of the engine 14.

As shown in FIGS. 3-6, the turbocharger 34 includes a waste-gate assembly 60. The waste-gate assembly 60 includes a first waste-gate valve 62 and a second waste-gate valve 64. The first waste-gate valve 62 is configured to selectively redirect at least a portion of the post-combustion gases 30 away from the turbine scroll 50 and the turbine wheel 46 into the exhaust passage 36A by selectively opening and closing a first bypass 66. Similarly, the second waste-gate valve 64 is configured to selectively redirect at least a portion of the post-combustion gases 30 away from the turbine wheel 46 into the exhaust passage 36A by selectively opening and closing a second bypass 68. By redirecting some portion of the post-combustion exhaust gases 30 away from the turbine wheel 46, the waste-gate assembly 60 limits rotational speed of the rotating assembly 39 and the degree to which the airflow 38 becomes pressurized by the turbocharger 34. As shown, the waste-gate assembly 60 can redirect the post-combustion gases 30 to the exhaust passage 36A via a turbine housing outlet 48A.

Figure 4:
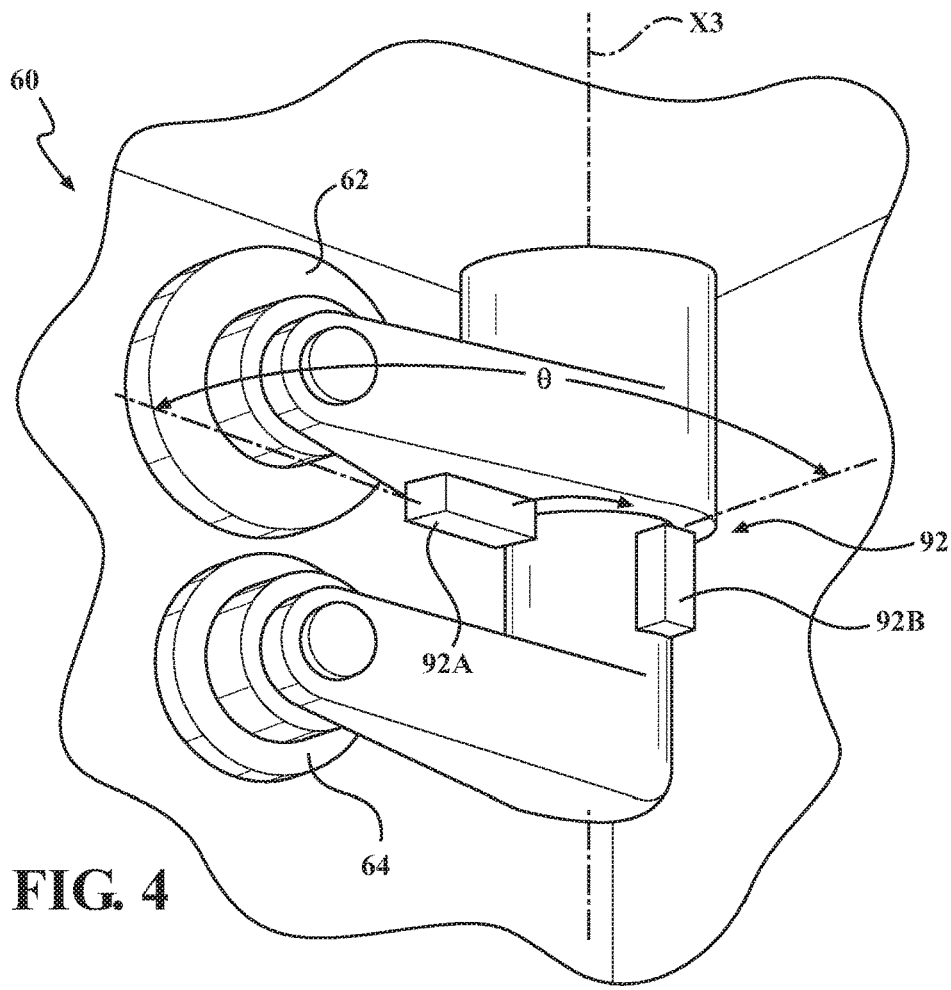
FIG. 4 is a partial perspective view of another embodiment of the waste-gate assembly in the turbocharger shown in FIG. 1, according to the disclosure.

The turbine housing 48 can be configured to define the first bypass 66 and the second bypass 68. The first bypass 66 generates a first fluid path 70, while the second bypass 68 generates a respective second fluid path 72 from the turbine wheel 46 into the exhaust passage 36A. In the case where the turbine housing 48 defines more than one scroll 50, each scroll can be configured to define one first bypass 66 and one second bypass 68. As shown in FIGS. 3 and 4, the first bypass 66 has a first cross-sectional area 66A and the second bypass 68 has a second cross-sectional area 68A. The first cross-sectional area 66A can be greater than the second cross-sectional area 68A. Additionally, the first waste-gate valve 62 can be defined by a first valve diameter D1, and the second waste-gate valve 64 can be defined by a second valve diameter D2. Accordingly, the first valve diameter D1 can be greater than the second valve diameter D2.

As shown in FIGS. 1, 3, and 6-7, the vehicle 10 also includes a controller 74. The controller 74 can be a powertrain controller, for example, configured to regulate operation of the engine 14 and the transmission 16. Additionally, the controller 74 is configured to regulate the waste-gate assembly 60, as discussed in detail below. In order to appropriately control operation of the waste-gate assembly 60, the controller 74 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 74 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 74 may also include a floppy disk, a flexible disk, hard disk, magnetic tape, any other magnetic medium, a CD-ROM, DVD, any other optical medium, etc. The controller 74 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 74 or accessible thereby may be stored in the memory and automatically executed to provide the required functionality.

With resumed reference to FIG. 1, the exhaust system 36 for the engine 14 includes at least one exhaust after-treatment (AT) device, generally indicated by numeral 78. As shown, the exhaust passage 36A is configured to direct the post-combustion gases 30 to the exhaust after-treatment device 78. In the event that the engine 14 is a gasoline engine, as shown in FIG. 1, the AT device 78 may be a three-way catalytic converter. As understood by those skilled in the art, a three-way catalytic converter is an exhaust after-treatment device that simultaneously performs three tasks: i) oxidation of nitrogen oxides, ii) oxidation of carbon monoxide, and iii) oxidation of unburned hydrocarbons. The three-way catalytic converter may be regenerated to unload the deposited hydrocarbon emissions in order to forestall elevated temperatures in the catalyst that may eventually cause damage thereto. The first two tasks listed above employ a process of selective catalytic reduction (SCR) for converting oxides of nitrogen, also referred to as $NO_X$ with the aid of a catalyst into diatomic nitrogen, $N_2$, and water, $H_2O$. SCR is frequently employed to reduce $NO_X$ emissions in the exhaust of internal combustion engines used to power motor vehicles. Exhaust emissions of both gasoline and diesel engines may be improved by SCR.

In the event that the engine 14 is a diesel engine (not shown), the exhaust system 36 may include a series of AT devices 78. Such AT devices 78 in the diesel engine 14 can include a diesel oxidation catalyst, a selective catalytic reduction (SCR) catalyst, and a diesel particulate filter, none of which are shown, but are known to those skilled in the art. Such exhaust after-treatment devices can be employed to reduce various exhaust emissions of the diesel engine. Specifically, the SCR catalyst is employed to reduce the emission of $NO_X$ via the SCR process described above with respect to the gasoline engine specific three-way catalytic converter and be positioned as the first AT device 78 downstream of the engine 14.

After a cold-start of the engine 14, i.e., when the engine is activated with its temperature at or near ambient, the engine proceeds through a "warm-up" period during which the engine's operating temperature is steadily increased. During the first couple minutes of operation of an internal combustion engine that has been started from cold, an amount of exhaust emissions can be significantly higher than emissions during the engine's steady state operation. In cold engines fuel does not vaporize completely, thus requiring richer air-fuel ratios. Rich air-fuel ratios, in turn, generate higher emissions of hydrocarbons, nitrogen oxides, and carbon monoxide, which diminish only as the engine reaches operating temperature. A vehicle with a cold engine also generates increased exhaust emissions, because a typical AT device is less efficient under cold conditions and until the subject AT device achieves light-off, i.e., reaches its effective operating temperature. One approach to reduce the time it takes for an AT device to light-off is to mount the subject AT device within an engine compartment of the host vehicle 10, i.e., close-couple it to the engine 14, right after the turbocharger 34.

The controller 74 is configured to identify a cold-start of the engine 14. As understood by those skilled in the art, an engine coolant 80 can be used to remove heat energy from the engine 14. The vehicle 10 can also include a coolant sensor 82 in electronic communication with the controller 74. Accordingly, the controller 74 can be configured to identify an occurrence of the engine 14 by detecting a temperature of the engine coolant 80 by the coolant sensor 82.

Specifically, identification of the cold-start of the engine 14 can be based on the coolant sensor 82 detecting the temperature of the engine coolant 80 below a predetermined temperature value 84A, such as substantially equivalent to ambient temperature. The ambient temperature can be detected via a dedicated temperature sensor (not shown) and communicated to the controller 74. The controller 74 is also configured to open the first waste-gate valve 62 and the second waste-gate valve 64 in response to the identified cold-start of the engine. Accordingly, the controller 74 can selectively redirect away from the turbine wheel 46 into the exhaust passage 36A the largest portion of the of the post-combustion gases 30 permitted by both cross-sectional areas 66A, 68A of the respective first and second bypasses 66, 68 during the cold-start operation of the engine 14. The controller 74 is configured to open both the first bypass 66 via the first waste-gate valve 62 and open the second bypass 68 via the second waste-gate valve 64 in response to the identified cold-start of the engine to thereby accelerate triggering the light-off of the AT device 78.

The controller 74 is also configured to identify a boosted operation of the engine 14, particularly when the engine has warmed up above a predetermined engine operating temperature 84B. The controller 74 is also configured to selectively regulate the first waste-gate valve 62 and/or the second waste-gate valve 64 in response to the identified boosted engine operation, such as above the predetermined engine operating temperature 84B, to redirect at least a portion of the post-combustion gases 30 away from the turbine wheel 46 into the exhaust passage 36A. Such redirection of the post-combustion gases 30 away from the turbine wheel 46 above the predetermined engine operating temperature 84B is intended to limit rotational speed of the compressor wheel 52 during boosted operation of the turbocharger 34.

Figure 5:
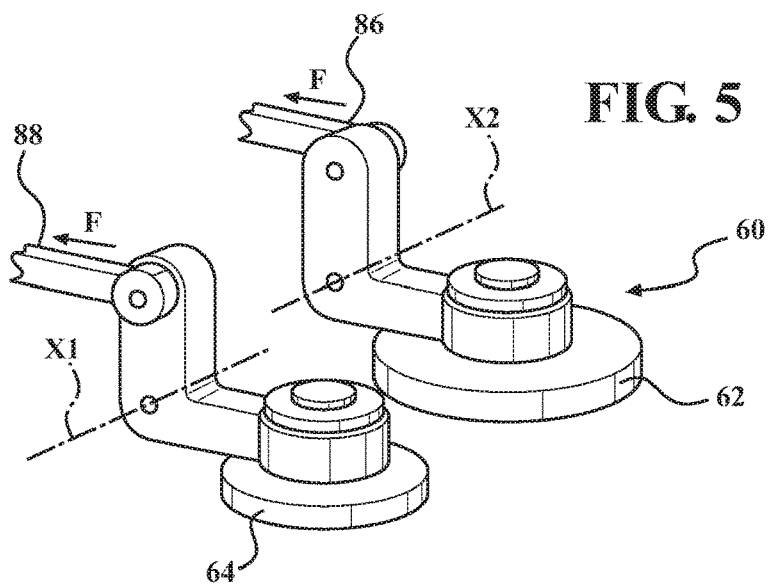
FIG. 5 is a schematic partial close-up cross-sectional side view of the waste-gate assembly shown in FIG. 3 according to another embodiment.

FIG. 5 represents schematically the specific embodiment shown in FIG. 3. As shown in each of FIGS. 3 and 5, the turbocharger 34 includes a first actuator 86 configured to operate the first waste-gate valve 62 and a separate second actuator 88 configured to operate the second waste-gate valve 64. As shown in FIG. 5, each of the first actuator 86 and the second actuator 88 operate the respective first and second waste-gate valves 62, 64 via a respective force F. In such an embodiment, the controller 74 can be configured to coordinate operation of the first actuator 86 and the second actuator 88. Additionally, in the embodiment of FIGS. 3 and 5 having separate first and second actuators 86, 88, the first waste-gate valve 62 can be configured to pivot about a first axis X1, while the second waste-gate valve 64 can be configured to pivot about a second axis X2 that is distinct from the first axis. Accordingly, in the embodiment of FIGS. 3 and 5, the controller 74 can be configured to regulate operation of the first actuator 86 to primarily operate the first waste-gate valve 62 during boosted operation of the engine 14. Additionally, the controller 74 can be configured to engage the second waste-gate valve 64 via the second actuator 88 to operate both waste-gate valves 62, 64 in response to the identified cold-start of the engine 14 to thereby accelerate triggering the light-off of the AT device 78.

In a separate embodiment shown in FIG. 4, the turbocharger 34 can include a single, common actuator 90 combined with a linking mechanism generally indicated by numeral 92 for operating the first waste-gate valve 62 and the second waste-gate valve 64. Such a linking mechanism 92 may be configured as a pair of cooperating tabs, a first tab 92A and a second tab 92B. As shown, the first tab 92A is fixed to the first waste-gate valve 62, while the second tab 92B is fixed to the second waste-gate valve 64. In such an embodiment, the controller 74 regulates operation of the common actuator 90. During operation of the waste-gate assembly 60, initially, the first waste-gate valve 62 will be opened, then, after some predetermined angle of rotation θ of the first waste-gate valve, the first tab 92A will contact the second tab 92B and commence opening of the second waste-gate valve 64. As shown in the embodiment of FIG. 4, the first waste-gate valve 62 and the second waste-gate valve 64 are configured to pivot about a common axis X3. Accordingly, in the embodiment of FIGS. 4 and 6, the angle of rotation θ is preset to facilitate the opening of the second waste-gate valve 64 during the identified cold-start of the engine 14 to thereby accelerate triggering the light-off of the AT device 78.

Figure 6:
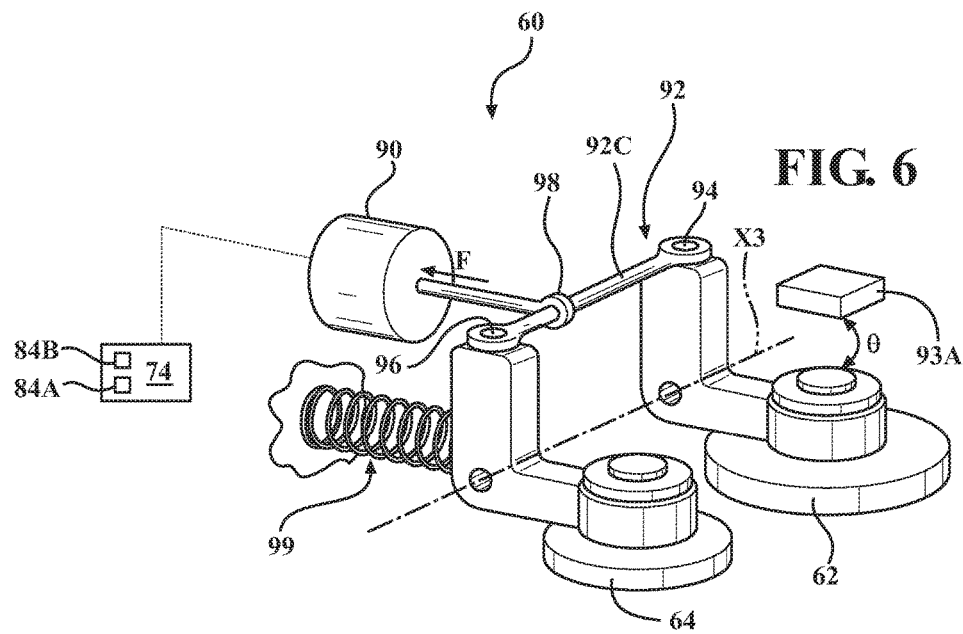
FIG. 6 is a schematic partial close-up cross-sectional side view of the waste-gate assembly shown in FIG. 3 according to another alternate embodiment.

FIG. 6 represents schematically another embodiment of the turbocharger 34 employing a common actuator 90 with a linking mechanism 92 for operating the first waste-gate valve 62 and the second waste-gate valve 64. As shown in FIG. 6, the linking mechanism 92 may be configured as a balance bar 92C. According to the disclosure, the balance bar 92C is configured as a kinematic linkage with one actuation point 94 for the first waste-gate valve 62 and another actuation point 96 for the second waste-gate valve 64. In such an embodiment, both the first waste-gate valve 62 and the second waste-gate valve 64 can be configured to pivot about the common axis X3. The actuator 90 can be arranged to apply a force F to the balance bar 92C at a point 98 arranged between the points 94 and 96.

The point 98 can be positioned fractionally closer to the point 96 as compared with point 94, to thereby facilitate opening of the first waste-gate valve 62 prior to the opening of the second waste-gate valve 64. The balance bar 92C travel can be limited by the first waste-gate valve 62 being seated at a closed position. The second waste-gate valve 64 can be preloaded by a spring 99, such that the actuator 90 can initially operate the balance bar 92C to open the first waste-gate valve 62 using the point 96 at the second waste-gate valve as a pivot. As first waste-gate valve 62 achieves a hard stop 93A at its maximum travel, the second waste-gate valve 64 will start to open. Therefore, in such an embodiment, the controller 74 can regulate the common actuator 90 to open the first waste-gate valve 62 and the second waste-gate valve 64 in sequential order.

Figure 7:
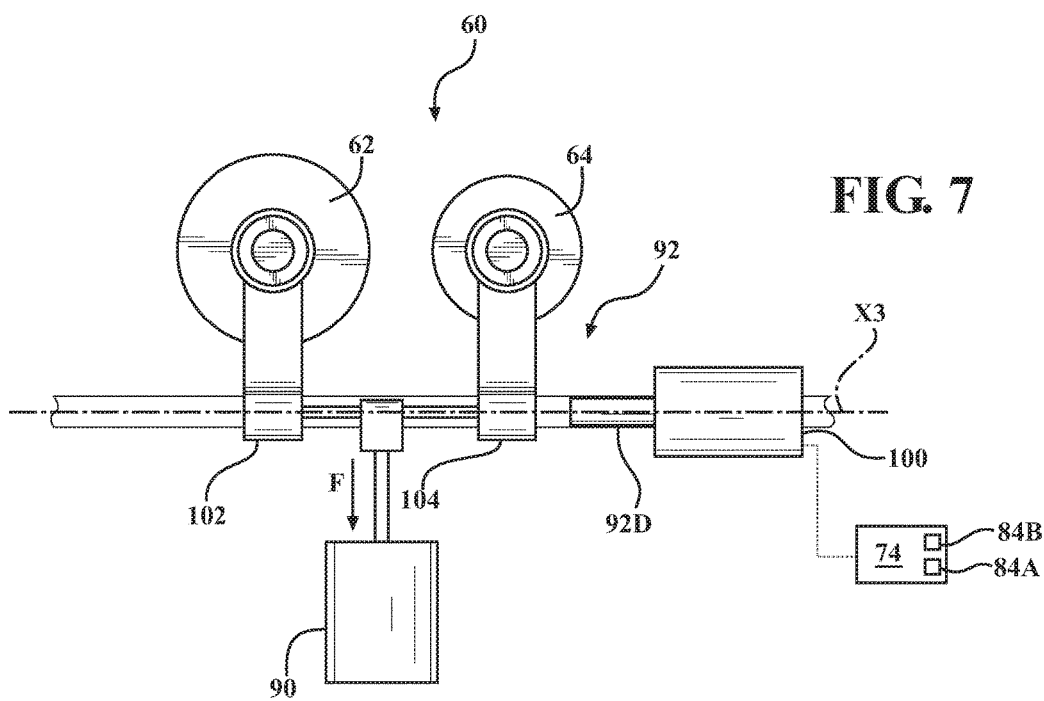
FIG. 7 is a schematic partial close-up cross-sectional side view of the waste-gate assembly shown in FIG. 3 according to yet another alternate embodiment.

As shown in FIG. 7, linking mechanism 92 may also be configured as a locking pin 92D operated by a solenoid 100 to selectively connect the single actuator 90 to the second waste-gate valve 64. In such an embodiment, both the first waste-gate valve 62 and the second waste-gate valve 64 can also be configured to pivot about the common axis X3. The actuator 90 can be arranged to apply the force F to the first waste-gate valve 62 at an eccentrically shaped surface 102 and the second waste-gate valve 64 at an eccentrically shaped surface 104. The solenoid 100 can be regulated or energized by the controller 74 to extend the locking pin 92D and thereby connect the second waste-gate valve 64 to the first waste-gate valve 62 for concurrent actuation. Accordingly, the controller 74 can be configured to regulate operation of the actuator 90 and the locking pin 92D to primarily operate the first waste-gate valve 62 during boosted operation of the engine 14.

The controller 74 can be further configured to engage the second waste-gate valve 64 via the locking pin 92D to operate both waste-gate valves 62, 64 in response to the identified cold-start of the engine 14 and thereby accelerate triggering the light-off of the AT device 78. For an embodiment configured to engage the second waste-gate valve 64 via the locking pin 92D after the first waste-gate valve 62 has already been opened, the eccentrically shaped surfaces 102, 104 may be provided with dissimilar profiles to facilitate more rapid opening action of the second waste-gate valve 64 as compared with the first waste-gate valve 62.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A turbocharger for pressurizing an airflow to be delivered to an internal combustion engine that generates post-combustion gases, the turbocharger comprising:
a compressor wheel configured to pressurize the airflow;
a turbine wheel configured to be driven by the post-combustion gases and drive the compressor wheel;
a waste-gate assembly including a first waste-gate valve and a second waste-gate valve, wherein each of the first and second waste-gate valves is configured to selectively redirect at least a portion of the post-combustion gases away from the turbine wheel; and
a first actuator configured to operate the first waste-gate valve and a separate second actuator configured to operate the second waste-gate valve.

2. The turbocharger of claim 1, further comprising a turbine housing defining a first bypass and a second bypass, wherein:
the turbine wheel is disposed inside the turbine housing and each of the first bypass and second bypass generates a respective first and second fluid path for redirecting at least a portion of the post-combustion gases away from the turbine wheel;
the first waste-gate valve is configured to selectively open and close the first bypass; and
the second waste-gate valve is configured to selectively open and close the second bypass.

3. The turbocharger of claim 1, wherein:
the first bypass has a first cross-sectional area and the second bypass has a second cross-sectional area; and
the first cross-sectional area is greater than the second cross-sectional area.

4. The turbocharger of claim 3, wherein:
the first waste-gate valve is characterized by a first valve diameter and the second waste-gate valve is characterized by a second valve diameter; and
the first valve diameter is greater than the second valve diameter.

5. The turbocharger of claim 1, wherein the first waste-gate valve is configured to pivot about a first axis and the second waste-gate valve is configured to pivot about a second axis that is distinct from the first axis.

6. A vehicle comprising:
an internal combustion engine configured to generate power via combustion of fuel and airflow and generate post-combustion gases;
an exhaust passage configured to remove the post-combustion gases from the engine;
a turbocharger configured to pressurize an airflow for delivery to the engine, wherein the turbocharger includes:
a compressor wheel configured to pressurize the airflow;
a turbine wheel configured to be driven by the post-combustion gases and drive the compressor wheel; and
a waste-gate assembly including a first waste-gate valve and a second waste-gate valve and configured to selectively redirect at least a portion of the post-combustion gases away from the turbine wheel into the exhaust passage;
a sensor configured to detect an engine operation; and
a controller operatively connected to the engine, the controller including executable instructions stored on a non-transitory memory to:
identify a cold-start of the engine via the sensor;
open the first turbocharger for pressurizing an airflow to be delivered to an internal combustion engine that generates post-combustion gases, the turbocharger comprising waste-gate valve and the second waste-gate valve in response to the identified cold-start of the engine;
identify a boosted operation of the engine; and
regulate at least one of the first waste-gate valve and the second waste-gate valve between an open and a closed position in response to the identified boosted engine operation.

7. The vehicle of claim 6, wherein:
the turbocharger includes a turbine housing defining a first bypass and a second bypass;
each of the first and second bypasses generates a respective fluid path for redirecting at least a portion of the post-combustion gases away from the turbine wheel into the exhaust passage; and
the first waste-gate valve is configured to selectively open and close the first bypass and the second waste-gate valve is configured to selectively open and close the second bypass.

8. The vehicle of claim 7, wherein:
the first bypass has a first cross-sectional area and the second bypass has a second cross-sectional area; and
the first cross-sectional area is greater than the second cross-sectional area.

9. The vehicle of claim 8, wherein:
the first waste-gate valve is characterized by a first valve diameter and the second waste-gate valve is characterized by a second valve diameter; and
the first valve diameter is greater than the second valve diameter.

10. The vehicle of claim 6, wherein the turbocharger includes a first actuator configured to operate the first waste-gate valve and a separate second actuator configured to operate the second waste-gate valve.

11. The vehicle of claim 10, wherein the controller is configured to regulate operation of the first actuator and the second actuator.

12. The vehicle of claim 10, wherein the first waste-gate valve is configured to pivot about a first axis and the second waste-gate valve is configured to pivot about a second axis that is distinct from the first axis.

13. The vehicle of claim 6, wherein the turbocharger includes a single actuator and a linking mechanism together configured to selectively operate the first and second waste-gate valves.

14. The vehicle of claim 13, wherein the controller is configured to regulate operation of the single actuator and the linking mechanism.

15. The vehicle of claim 13, wherein both the first waste-gate valve and the second waste-gate valve are configured to pivot about a common axis.

16. The vehicle of claim 6, further comprising a coolant sensor in electronic communication with the controller, wherein an engine coolant is used to remove heat energy from the engine, and wherein the controller is configured to identify the cold-start of the engine by detecting the temperature of the engine coolant via the coolant sensor.

17. The vehicle of claim 6, wherein:
the exhaust passage is configured to direct the post-combustion gases to an exhaust after-treatment device; and
the controller additionally includes executable instructions to open both the first bypass via the first waste-gate valve and open the second bypass via the second waste-gate valve in response to the identified cold-start of the engine to thereby accelerate triggering a light-off of the exhaust after-treatment device.

* * * * *